US012725550B1

(12) United States Patent

Guo et al.

(10) Patent No.: US 12,725,550 B1
(45) Date of Patent: Sep. 1, 2026

(54) VEHICLE DISPLAY SYSTEM

(71) Applicant: Ford Global Technologies, LLC, Dearborn, MI (US)

(72) Inventors: Biaohe Guo, Northville, MI (US); Mark Larry, Macomb, MI (US); Junghua Hsiao, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 19/290,510

(22) Filed: Aug. 5, 2025

(51) Int. Cl.
*G09G 3/36* (2006.01)
*G09G 3/20* (2006.01)

(52) U.S. Cl.
CPC ....... *G09G 3/20* (2013.01); *G09G 2320/0626* (2013.01); *G09G 2360/16* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 8,217,887 | B2 | 7/2012 | Sangam et al. | |
| 9,330,630 | B2 | 5/2016 | Kerofsky | |
| 11,398,195 | B2 | 7/2022 | Wang et al. | |
| 11,869,450 | B2 | 1/2024 | Zhang | |
| 2005/0264549 | A1* | 12/2005 | Mizumaki ............ | G09G 3/3648 345/204 |
| 2010/0053066 | A1* | 3/2010 | Nonaka ................ | G09G 3/3648 345/102 |
| 2013/0342583 | A1* | 12/2013 | Kim ..................... | G09G 3/3696 345/211 |
| 2025/0006139 | A1 | 1/2025 | Bhattacharjee et al. | |

FOREIGN PATENT DOCUMENTS

| | | | |
|---|---|---|---|
| DE | 10201620922 | A1 | 12/2016 |

* cited by examiner

*Primary Examiner* — Carl Adams
(74) *Attorney, Agent, or Firm* — Frank Lollo; Brooks Kushman P.C.

(57) ABSTRACT

A computer includes a processor and a memory, and the memory stores instructions executable by the processor to determine an arithmetic mean of red-green-blue (RGB) values in an image frame, determine a luminance fraction as a function of the arithmetic mean, and actuate an edge-lit display screen to display the image frame at the luminance fraction of a maximum luminance. The luminance fraction is a fraction of the maximum luminance of the edge-lit display screen.

19 Claims, 4 Drawing Sheets

VEHICLE DISPLAY SYSTEM

BACKGROUND

Modern vehicles often include display screens. The display screens can be of various types suitable for displaying content legible to occupants of a vehicle, such as light-emitting diode (LED), organic light-emitting diode (OLED), liquid crystal display (LCD), plasma, digital light processing technology (DLPT), etc. A display screen may be mounted to the dashboard, where the display screen is visible to the occupants of the vehicle.

DETAILED DESCRIPTION

Figure 1:
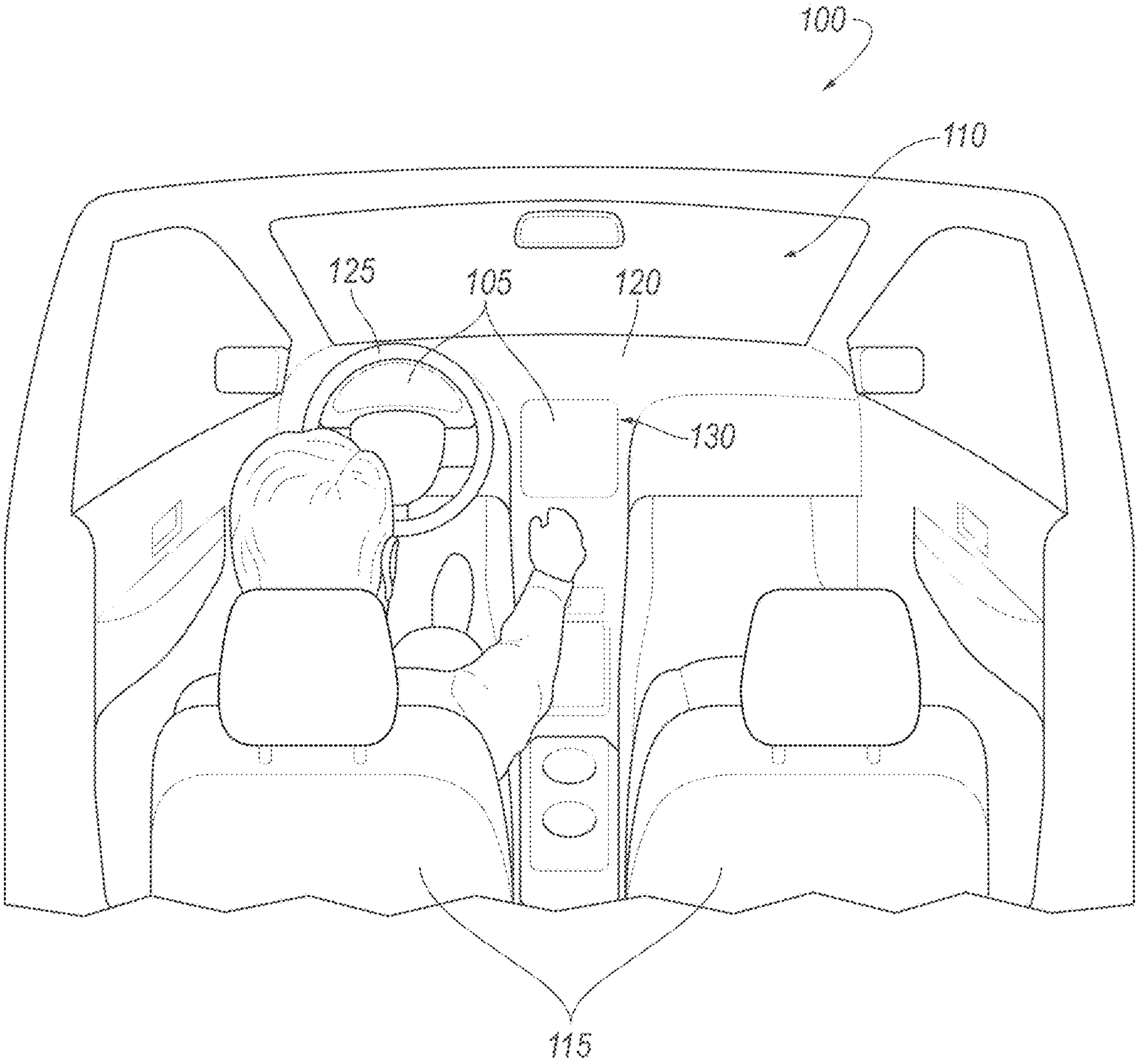
FIG. 1 is a rear perspective view of an example vehicle with a passenger compartment exposed for illustration.

This disclosure relates to controlling an edge-lit display screen, for example in a vehicle. A computer is programmed to determine an arithmetic mean of red-green-blue (RGB) values in an image frame, determine a luminance fraction as a function of the arithmetic mean, and actuate the edge-lit display screen to display the image frame at the luminance fraction of a maximum luminance of the edge-lit display screen. The edge-lit display screen can thus automatically adjust its brightness according to the brightness of the image frame to be displayed, for example, dimmer for bright images and brighter for dim images. The use of the arithmetic mean provides for a simple calculation, can be derived solely from the image data, and is able to account for the entirety of the image frame. These benefits make the use of the arithmetic mean helpful in the context of an edge-lit display because the brightness adjustment is not localized only to portions of the image.

A computer includes a processor and a memory, and the memory stores instructions executable by the processor to determine an arithmetic mean of red-green-blue (RGB) values in an image frame, determine a luminance fraction as a function of the arithmetic mean, and actuate an edge-lit display screen to display the image frame at the luminance fraction of a maximum luminance. The luminance fraction is a fraction of the maximum luminance of the edge-lit display screen.

In an example, the RGB values may include red values, green values, and blue values, and the instructions may further include instructions to determine a red arithmetic mean of the red values, a green arithmetic mean of the green values, and a blue arithmetic mean of the blue values; and determine the arithmetic mean of the RGB values by selecting a maximum of the red arithmetic mean, the green arithmetic mean, and the blue arithmetic mean.

In an example, the arithmetic mean may be determined from the RGB values over an entire area of the image frame.

In an example, the instructions to determine the luminance fraction may include instructions to determine the luminance fraction according to an inverse relationship between the luminance fraction and the arithmetic mean.

In an example, the instructions to determine the luminance fraction may include instructions to set the luminance fraction to a first preset value in response to the arithmetic mean exceeding a threshold, and to set the luminance fraction to a second preset value in response to the arithmetic mean being below the threshold. In a further example, the second preset value may be greater than the first preset value.

In another further example, the threshold may be a first threshold, and the instructions to determine the luminance fraction may include instructions to set the luminance fraction to the second preset value in response to the arithmetic mean being below the first threshold and exceeding a second threshold, and to set the luminance fraction to a third preset value in response to the arithmetic mean being below the second threshold.

In an example, the instructions to determine the luminance fraction may include instructions to determine the luminance fraction as a function of only the arithmetic mean.

In an example, the instructions may further include instructions to determine the maximum luminance as a function of an ambient brightness. In a further example, the instructions to determine the maximum luminance may include instructions to determine the maximum luminance according to a positive relationship between the maximum luminance and the ambient brightness.

In an example, the image frame may be a second image frame, and the instructions may further include instructions to, before actuating the edge-lit display screen to display the second image frame, actuate the edge-lit display screen to display a first image frame at the luminance fraction of the maximum luminance. In a further example, the luminance fraction may be a second luminance fraction, the arithmetic mean may be a second arithmetic mean, and the instructions may further include instructions to, before actuating the edge-lit display screen to display the first image frame at the second luminance fraction of the maximum luminance, actuate the edge-lit display screen to display the first image frame at a first luminance fraction of the maximum luminance based on a first arithmetic mean of RGB values in the first image frame.

In an example, the instructions to actuate the edge-lit display screen to display the image frame may include instructions to actuate the edge-lit display screen to display the image frame at the luminance fraction of the maximum luminance over an entire area of the edge-lit display screen.

In an example, the edge-lit display screen may be located inside a passenger compartment of a vehicle.

A method includes determining an arithmetic mean of red-green-blue (RGB) values in an image frame, determining a luminance fraction as a function of the arithmetic mean, and actuating an edge-lit display screen to display the image frame at the luminance fraction of a maximum luminance. The luminance fraction is a fraction of the maximum luminance of the edge-lit display screen.

In an example, determining the luminance fraction may include determining the luminance fraction according to an inverse relationship between the luminance fraction and the arithmetic mean.

In an example, determining the luminance fraction may include determining the luminance fraction as a function of only the arithmetic mean.

In an example, the method may further include, before actuating the edge-lit display screen to display the image frame, actuating the edge-lit display screen to display a preceding image frame at the luminance fraction of the maximum luminance.

In an example, the edge-lit display screen may be located inside a passenger compartment of a vehicle.

With reference to the Figures, wherein like numerals indicate like parts throughout the several views, a computer 405 includes a processor and a memory, and the memory stores instructions executable by the processor to determine an arithmetic mean of red-green-blue (RGB) values in an image frame, determine a luminance fraction as a function of the arithmetic mean, and actuate an edge-lit display screen 105 to display the image frame at the luminance fraction of a maximum luminance. The luminance fraction is a fraction of the maximum luminance of the edge-lit display screen 105.

With reference to FIG. 1, the edge-lit display screen 105 may be installed in a vehicle 100. The vehicle 100 may be any passenger or commercial automobile such as a car, a truck, a sport utility vehicle, a crossover, a van, a minivan, a taxi, a bus, etc.

The vehicle 100 includes a passenger compartment 110 to house occupants, if any, of the vehicle 100. The passenger compartment 110 includes one or more seats 115 disposed in a front row of the passenger compartment 110 and one or more of the seats 115 disposed in a second row behind the front row. The passenger compartment 110 may also include seats 115 in a third row (not shown) at a rear of the passenger compartment 110. The seats 115 are shown to be bucket seats in the front row and bench seats in the second row, but the seats 115 may be other types. The position and orientation of the seats 115 and components thereof may be adjustable by an occupant.

The passenger compartment 110 includes a dashboard 120. The dashboard 120 may be disposed at a forward end of the passenger compartment 110 and face toward the front seats 115. The dashboard 120 may include vehicle controls, such as a steering wheel 125; gauges, dials, and information displays; heating and ventilation equipment; a radio and other electronics; etc.

The vehicle 100 includes a user interface 130. The user interface 130 presents information to and receives information from an operator of the vehicle 100. The user interface 130 may be located on the dashboard 120 in the passenger compartment 110, and/or wherever may be readily seen by the operator. The user interface 130 may include dials, digital readouts, screens, speakers, and so on for providing information to the operator, such as human-machine interface (HMI) elements such as are known. The user interface 130 may include buttons, knobs, keypads, microphone, and so on for receiving information from the operator.

The user interface 130 includes the edge-lit display screen 105. The edge-lit display screen 105 is located inside the passenger compartment 110 of the vehicle 100. For example, the edge-lit display screen 105 may be mounted to the dashboard 120. The edge-lit display screen 105 may be positioned to be visible to an operator of the vehicle 100 while the head of the operator is facing forward in the direction of travel of the vehicle 100, meaning that the operator may be able to view the edge-lit display screen 105 by moving their eyes without moving their head. For example, the edge-lit display screen 105 may be positioned upward and forward from the steering wheel 125 (e.g., to serve as an instrument panel). For another example, the edge-lit display screen 105 may be positioned on a center stack of the dashboard 120 and be visible to the operator as well as other occupants.

As part of the user interface 130, the edge-lit display screen 105 may convey information to the occupant. For example, the edge-lit display screen 105 may display information about operation of the vehicle 100 such as speed, engine revolutions per minute, engine temperature, fuel quantity or battery charge, etc.; passenger compartment 110 statuses such as open doors, seat positions, climate-control settings, etc.; infotainment information such as radio station, media source, volume, connections to user devices, etc.; and other information.

Figure 2:
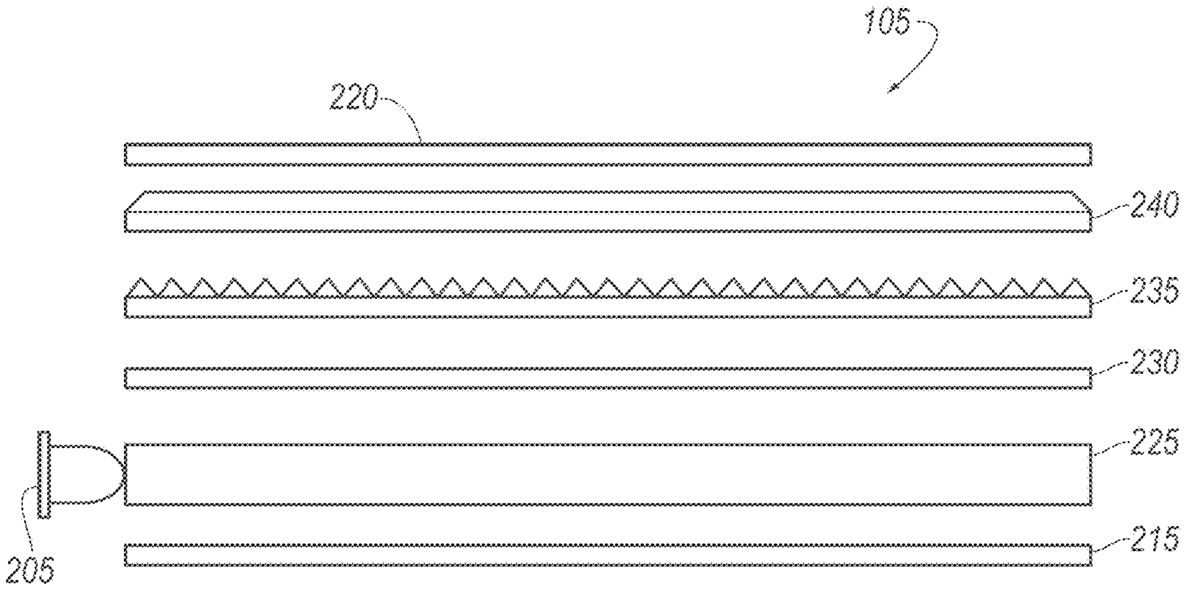
FIG. 2 is a diagrammatic exploded side cross-sectional view of an example edge-lit display screen of the vehicle.
Figure 3:
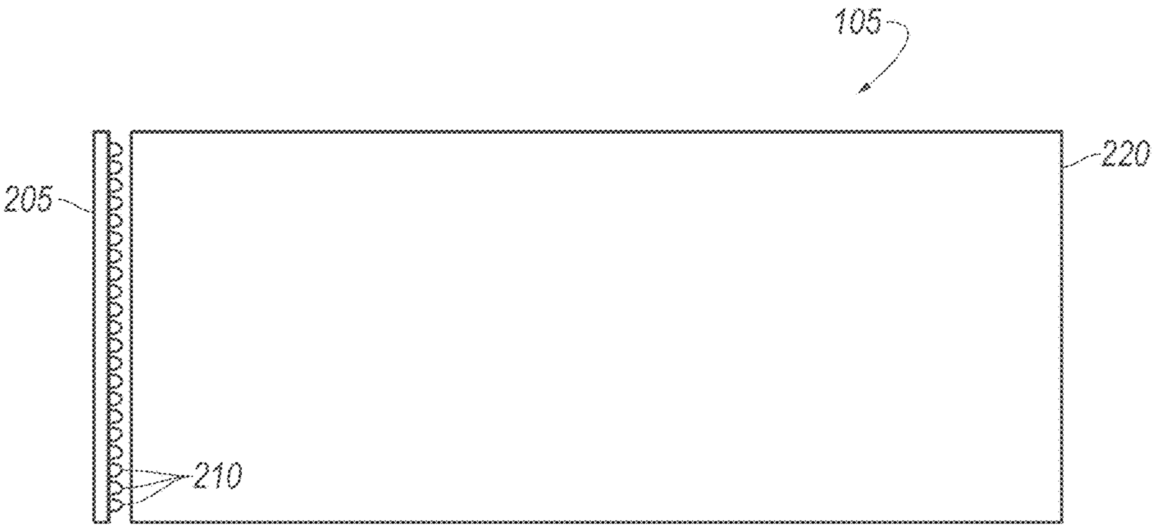
FIG. 3 is a diagrammatic plan view of the edge-lit display screen.

With reference to FIGS. 2-3, as a general overview of the edge-lit display screen 105, the edge-lit display screen 105 includes a circuit board 205, LEDs 210, a reflector 215, a display panel 220, and other layers. (For clarity, only some of the LEDs 210 are labeled.) The components of the edge-lit display screen 105 may be fixed relative to each other and fixed relative to the dashboard 120; in other words, the edge-lit display screen 105 may lack moving parts. FIGS. 2-3 show an edge-lit arrangement of the LEDs 210. Generally, the other layers may be sandwiched between the reflector 215 and the display panel 220. Generally, the LEDs 210 are mounted to the circuit board 205, and the circuit board 205 is arranged to direct emissions from the LEDs 210 to the display panel 220.

The circuit board 205 acts as a substrate for physically mounting and electrically connecting the LEDs 210. The circuit board 205 may be rigid. The circuit board 205 may have a generally flat shape (e.g., rectangular). The circuit board 205 may include a plurality of electric connections to the respective LEDs 210, so that the LEDs 210 may be independently controlled.

Each LED 210 is a semiconductor device that emits electromagnetic radiation when electrical current flows through it, via the phenomenon of electroluminescence. Each LED 210 includes a leadframe with an anvil and post (not shown). The leadframe is connected to anode and cathode pins. The anvil includes a semiconductor die that produces the electromagnetic radiation inside a reflective cavity. The leadframe may be housed in an epoxy lens or case. Each LED 210 may emit electromagnetic radiation at a wavelength defined by the construction and/or material of the semiconductor die. The LEDs 210 may include multiple wavelengths, such as red visible-light LEDs, green visible-light LEDs, and blue visible-light LEDs arranged in a regular pattern over the circuit board 205.

The display panel 220 may be an exteriormost rigid layer of the edge-lit display screen 105 (e.g., may be the exteriormost layer or may have one or more films on it). The display panel 220 may have a generally flat shape (e.g., rectangular). The display panel 220 is transparent to the wavelengths of electromagnetic radiation emitted by the LEDs 210. For example, the display panel 220 may be polycarbonate. The display panel 220 may protect the interior components of the edge-lit display screen 105 from the surrounding environment.

The edge-lit display screen 105 has an edge-lit arrangement. As shown in FIG. 2, the edge-lit display screen 105 may include a stack of layers sandwiched together, for example, in a direction from inside the dashboard 120 to outside the dashboard 120: the reflector 215, a light guide plate 225, a diffuser film 230, a vertical prism film 235, a horizontal prism film 240, and the display panel 220. In other words, the reflector 215, the light guide plate 225, the diffuser film 230, the vertical prism film 235, and the horizontal prism film 240 are fixed behind the display panel 220. The layers may have rectangular shapes with approximately the same length and width (but not necessarily thickness), and the rectangular shapes may be aligned with each other. The layers are parallel with each other and abut each other. The circuit board 205 is outside the stack of layers, that is, is not one of the layers of the stack.

With continued reference to FIG. 2, the circuit board 205 is fixed relative to the display panel 220 and the other layers of the stack, and the circuit board 205 is arranged to direct emissions from the LEDs 210 to the display panel 220. Specifically, the circuit board 205 is arranged to direct the emissions from the LEDs 210 into the light guide plate 225 at an edge of the light guide plate 225. The LEDs 210 are arranged on the circuit board 205 along the edge of the light guide plate 225. The light guide plate 225 is configured to reflect the electromagnetic radiation (e.g., visible light) from the edge where the circuit board 205 is attached along the full length or width of the light guide plate 225 to the opposite edge. For example, the light guide plate 225 may be made of poly(methyl methacrylate) (PMMA). With reference to FIG. 3, the LEDs 210 are arranged in a row along the edge of the light guide plate 225.

Figure 4:
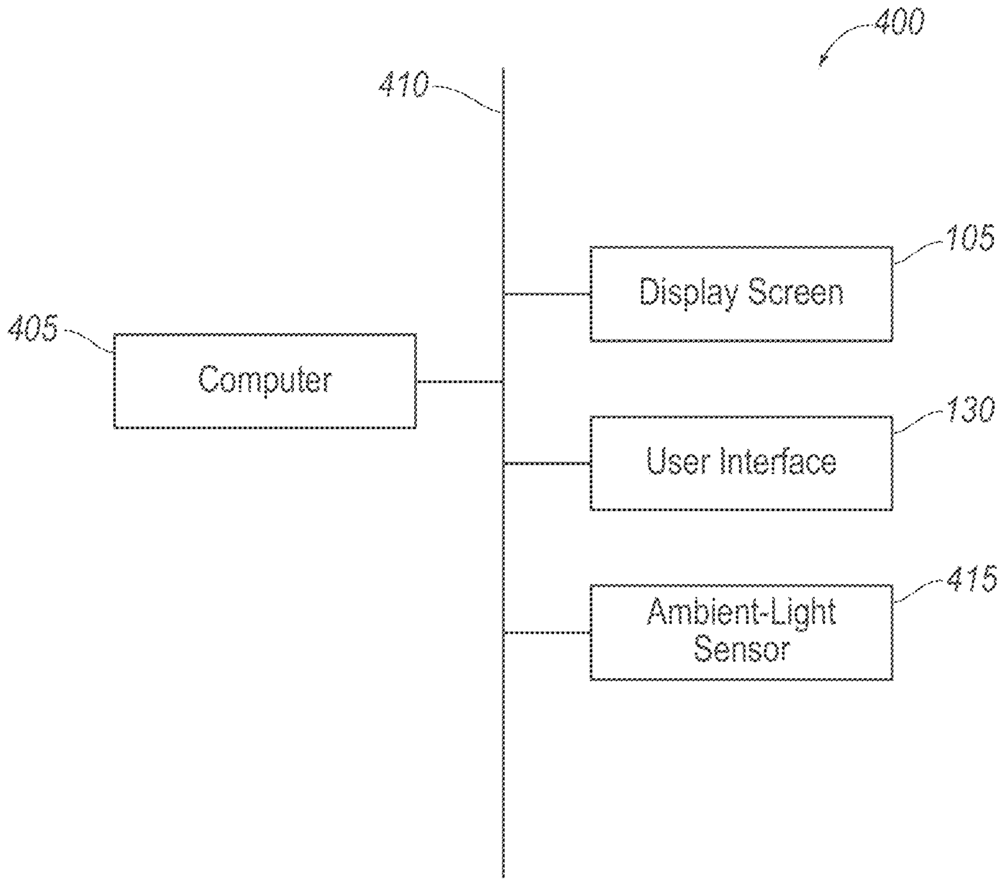
FIG. 4 is a block diagram of an example control system of the vehicle.

With reference to FIG. 4, the edge-lit display screen 105 may be operated by a control system 400 of the vehicle 100. The control system 400 may include the computer 405, a communications network 410, an ambient-light sensor 415, and the edge-lit display screen 105.

The computer 405 is a microprocessor-based computing device such as a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming (e.g., stored in a memory electrically connected to the FPGA circuit). The computer 405 can thus include a processor, a memory, etc. The memory of the computer 405 can include media for storing instructions executable by the processor as well as for electronically storing data and/or databases, and/or the computer 405 can include structures such as the foregoing by which programming is provided. The computer 405 can be multiple computers coupled together.

The computer 405 may transmit and receive data through the communications network 410. The communications network 410 may be a controller area network (CAN) bus, Ethernet, WiFi, Local Interconnect Network (LIN), onboard diagnostics connector (OBD-II), and/or any other wired or wireless communications network. The computer 405 may be communicatively coupled to the ambient-light sensor 415, the edge-lit display screen 105, and other components via the communications network 410.

The ambient-light sensor 415 is a photodetector that detects an amount of ambient light present (i.e., total light from sources in the environment). The ambient-light sensor 415 may be any suitable type, such as phototransistor, photodiode, photonic integrated circuit, etc.

The computer 405 may be programmed to receive an ambient brightness from the ambient-light sensor 415. The ambient brightness is an amount of brightness in the environment, for example, in the passenger compartment 110. The ambient brightness may be represented as a scalar number.

Each image frame is a two-dimensional matrix of pixels. Each pixel has color represented as one or more numerical values, such as values for each of red, green, and blue (e.g., each on an 8-bit scale (0 to 255) or a 12- or 16-bit scale). The red-green-blue (RGB) values include red values, green values, and blue values, such as one red value, one green value, and one blue value for each pixel. Position in an image frame can be specified in pixel dimensions or coordinates (e.g., an ordered pair of pixel distances), such as a number of pixels from a top edge and a number of pixels from a left edge of the image frame. For example, the pixel (u, v) may have RGB values ($r_{u,v}$, $g_{u,v}$, $b_{u,v}$). The pixels may also be indexed with a single dimension, such as counting across each row and progressing from a top row to a bottom row (e.g., an index i counting from 1 to N, in which N is the total number of pixels, that is, u×v).

The computer 405 may be programmed to receive image frames. For example, the image frames may be generated by another application being executed by the computer 405, such as a user-interface application. The image frame may depict menus or controls for receiving inputs from the operator or occupant or data about the vehicle 100 or environment relevant to the operator or occupant. An image frame may include, in whole or in part, image data generated by a camera of the vehicle 100, such as a backup camera. The user-interface application running on the computer 405 may generate the image frames and transmit the image frames to a display-control application running on the computer 405. The display-control application may receive the image frames and perform the steps described below.

Image frames may be organized in a sequence, such as according to the user-interface application. For example, one or more image frames may be possible next image frames from a current image frame. The current image frame may depict a plurality of options selectable by an occupant (e.g., as part of a menu structure defined by the user-interface application). Each option may be associated with one of the possible next image frames. Selection of an option may cause the computer 405 to actuate the edge-lit display screen 105 to display the associated possible next image frame (possibly in addition to instructing the computer 405 to perform some other action).

The computer 405 is programmed to determine the luminance fraction of the maximum luminance of the edge-lit display screen 105 based on the RGB values in an image frame and to actuate the edge-lit display screen 105 to display the image frame at the luminance fraction of the maximum luminance. As a general overview, the computer 405 determines a red arithmetic mean of the red values, a green arithmetic mean of the green values, and a blue arithmetic mean of the blue values. The computer 405 determines the arithmetic mean based on the red, green, and blue arithmetic means. The computer 405 determines the luminance fraction as a function of the arithmetic mean. The computer 405 may determine the maximum luminance as a function of the ambient brightness. The computer 405 actuates the edge-lit display screen 105 to display the image frame at the luminance fraction of the maximum luminance.

The computer 405 may be programmed to determine a red arithmetic mean of the red values, a green arithmetic mean of the green values, and a blue arithmetic mean of the blue values. For the purposes of this disclosure, "arithmetic mean" is used in its mathematical sense as a sum of a collection of numbers divided by a count of the collection of numbers (i.e., how many numbers are in the collection). In this case, the red arithmetic mean is a sum of the red values from the pixels of the image frame divided by the number of pixels. The red arithmetic mean may be determined from the red values over an entire area of the image frame, as given by the following expression:

$$\bar{r} = \frac{1}{N}\sum_{i=1}^{N} r_i$$

in which $\bar{r}$ is the red arithmetic mean, i is an index of the pixels, N is the total number of pixels in the image frame, and $r_i$ is the red value of the ith pixel. Similarly, the green arithmetic mean is a sum of the green values from the pixels of the image frame divided by the number of pixels. The green arithmetic mean may be determined from the green values over an entire area of the image frame, as given by the following expression:

$$\bar{g} = \frac{1}{N}\sum_{i=1}^{N} g_i$$

in which $\bar{g}$ is the green arithmetic mean and $g_i$ is the green value of the ith pixel. The blue arithmetic mean is a sum of the blue values from the pixels of the image frame divided by the number of pixels. The blue arithmetic mean may be determined from the blue values over an entire area of the image frame, as given by the following expression:

$$\bar{b} = \frac{1}{N}\sum_{i=1}^{N} b_i$$

in which $\bar{b}$ is the blue arithmetic mean and $b_i$ is the blue value of the ith pixel.

The computer 405 is programmed to determine the arithmetic mean of the RGB values in an image frame. For example, the computer 405 may determine the arithmetic mean of the RGB values by selecting a maximum of the red arithmetic mean, the green arithmetic mean, and the blue arithmetic mean, as in the following expression:

$$\bar{p} = \max\{\bar{r}, \bar{g}, \bar{b}\}$$

in which $\bar{p}$ is the arithmetic mean. By using the maximum of the red, green, and blue arithmetic means, the brightness of the edge-lit display screen 105 can be adjusted downward from a baseline of how close any of the red, green, or blue brightnesses are to a ceiling value. The arithmetic mean is determined from the RGB values over an entire area of the image frame, such as by selecting from the red, green, and blue arithmetic means, each of which are determined over the entire area of the image frame. Alternatively to using the maximum of the red, green, and blue arithmetic means, the computer 405 may average the red, green, and blue arithmetic means to arrive at the arithmetic mean.

The luminance fraction is a fraction of the maximum luminance of the edge-lit display screen 105. The luminance fraction is thus a unitless value between zero and one, inclusive (or, equivalently, a percentage from 0% to 100%). The maximum luminance is a ceiling value of the brightness emitted by the edge-lit display screen 105. As described below, the maximum luminance may be adjustable. An upper limit of the maximum luminance may be a physical property of the edge-lit display screen 105. The maximum luminance may be expressed in units of brightness (e.g., lux) or as a fraction of the upper limit.

The computer 405 is programmed to determine the luminance fraction as a function of the arithmetic mean. For example, the computer 405 may determine the luminance fraction as a function of only the arithmetic mean, as in the following expression:

$$K_L = f(\bar{p})$$

in which $K_L$ is the luminance fraction. Using only the arithmetic mean provides for a simple computation, while still providing smooth behavior for the brightness over time. For example, the function *f* may define an inverse relationship between the luminance fraction and the arithmetic mean, and the computer 405 may determine the luminance fraction according to the inverse relationship. For the purposes of this disclosure, an "inverse relationship" is defined as a relationship between two quantities in which an increase in one of the quantities leads to a decrease in the other of the quantities. In other words, the computer 405 may increase the luminance fraction in response to a decrease of the arithmetic mean, and decrease the luminance fraction in response to an increase of the arithmetic mean. For example, the luminance fraction may have a linear relationship, that is, $K_L = m\bar{p}$, in which m is a slope chosen experimentally to give high contrast for different image brightnesses. Because of the inverse relationship, the value of the slope m is negative.

For another example, the luminance fraction may be chosen from a number of preset values based on the arithmetic mean. In the example of two preset values, the computer 405 may select a first preset value in response to the arithmetic mean exceeding a threshold, and the computer 405 may select a second preset value in response to the arithmetic mean being below the threshold, as in the following expression:

$$K_L = f(\bar{p}) = \begin{cases} K_{L1} & \bar{p} > p_{th} \\ K_{L2} & \bar{p} < p_{th} \end{cases}$$

in which $K_{L1}$ is the first preset value, $K_{L2}$ is the second preset value, and $p_{th}$ is the threshold. Because of the inverse relationship, the second preset value is greater than the first preset value. More thresholds may be used, for example, two, three, four, or more. For the example of three thresholds, the computer 405 may set the luminance fraction to a first preset value in response to the arithmetic mean exceeding a first threshold, set the luminance fraction to a second preset value in response to the arithmetic mean being below the first threshold and exceeding a second threshold, set the luminance fraction to a third preset value in response to the arithmetic mean being below the second threshold and exceeding a third threshold, and set the luminance fraction to a fourth preset value in response to the arithmetic mean being below the third threshold, as in the following expression:

$$K_L = f(\bar{p}) = \begin{cases} K_{L1} & \bar{p} > p_{th1} \\ K_{L2} & p_{th1} > \bar{p} > p_{th2} \\ K_{L3} & p_{th2} > \bar{p} > p_{th3} \\ K_{L4} & p_{th3} > \bar{p} \end{cases}$$

in which $K_{Lj}$ is jth preset value for j from 1 to 4 and $p_{thk}$ is the kth threshold for k from 1 to 3. Because of the inverse relationship, $K_{L1}<K_{L2}<K_{L3}<K_{L4}$.

The computer 405 may be programmed to determine the maximum luminance as a function of the ambient brightness. For example, the computer 405 may determine the maximum luminance as a function of only the ambient brightness, as in the following expression:

$$L_{max}=f(I_{amb})$$

in which $L_{max}$ is the maximum luminance and $I_{amb}$ is the ambient brightness. For example, the function $f$ may define a positive relationship between the maximum luminance and the ambient brightness, and the computer 405 may determine the maximum luminance according to the positive relationship. For the purposes of this disclosure, a "positive relationship" is defined as a relationship between two quantities in which an increase in one of the quantities leads to an increase in the other of the quantities. In other words, the computer 405 may increase the maximum luminance in response to an increase of the ambient brightness, and decrease the maximum luminance in response to a decrease of the ambient brightness. For example, the maximum luminance and the ambient brightness may have a linear relationship, that is, $L_{max}=mI_{amb}$, in which m is a slope chosen experimentally such that the displayed image frames have high contrast at different ambient brightnesses. Because of the positive relationship, the value of the slope m is positive.

For another example, the maximum luminance may be chosen from a number of preset values (e.g., two) based on the ambient brightness. In the example of two preset values, the computer 405 may select the greater preset value in response to the ambient brightness being greater than a threshold, and the computer 405 may select the lesser preset value in response to the ambient brightness being less than the threshold. The threshold may be chosen to correspond to the transition between daytime and nighttime. Alternatively, more thresholds may be used, for example, two, three, four, or more.

The computer 405 is programmed to actuate the edge-lit display screen 105 to display the image frame at the luminance fraction of the maximum luminance. The computer 405 may adjust a brightness of the LEDs 210 to a value corresponding to the luminance fraction of the maximum luminance (e.g., to a product of the luminance fraction, the maximum luminance, and the upper limit of the brightness of the edge-lit display screen 105, in other words $K_L L_{max} U$, in which U is the upper limit). The computer 405 may control the brightness of the LEDs 210 by changing a pulse-width modulation of the LEDs 210; in other words, the computer 405 may increase the brightness by increasing a proportion of the time that an LED 210 is switched on, thereby increasing the average current that the LED 210 receives, and the computer 405 may decrease the brightness by decreasing the proportion of the time that the LED 210 is switched on, thereby decreasing the average current that the LED 210 receives. With pulse-width modulation, the average current can be changed even while the voltage across the LED 210 is constant.

The computer 405 may actuate the edge-lit display screen 105 to display the image frame at the luminance fraction of the maximum luminance over an entire area of the edge-lit display screen 105. The computer 405 may adjust the brightness of all the LEDs 210 to the value together, thereby affecting the entire edge-lit display screen 105.

When changing from displaying a current image frame to a next image frame, the edge-lit display screen 105 may transition from the luminance fraction for the current image frame to the luminance fraction for the next image frame before transitioning from the current image frame to the next image frame. The current image frame may precede next image frame in sequence, as described above. In relation to the next image frame, the current image frame is a preceding image frame. The computer 405 may be programmed to, before actuating the edge-lit display screen 105 to display the next image frame, actuate the edge-lit display screen 105 to display the current image frame at the luminance fraction of the maximum luminance determined with respect to the next image frame. In other words, the computer 405 may determine the luminance fraction based on the RGB values in the next image frame and use that luminance fraction for displaying the current image frame, in anticipation of the changeover from the current image frame to the next image frame.

As an overview of the sequence, first, the computer 405 is actuating the edge-lit display screen 105 to display a first image frame at a first luminance fraction of the maximum luminance based on a first arithmetic mean of RGB values in the first image frame, determined as described above. Second, in response to receiving an indication of an impending transition from the first image frame to a second image frame, the computer 405 determines a second luminance fraction for the second image based on the RGB values in the second image frame (as described above) and actuates the edge-lit display screen 105 to display the first image at the second luminance fraction of the maximum luminance. Third, the transition from the first image frame to the second image frame occurs, and the computer 405 actuates the edge-lit display screen 105 to display the second image at the second luminance fraction of the maximum luminance.

The indication of the impending transition from the first image frame to the second image frame may be defined by the user-interface application. For example, the indication may be an input by the operator that causes the transition from the first image frame to the second image frame. Upon receiving the input, the computer 405 may change the luminance fraction before changing the image frame. For another example, the indication may be a length of time passing since the first image frame began displaying. The length of time may be chosen to approximate a typical amount of time that an occupant reads the first image frame before making a selection.

Figure 5:
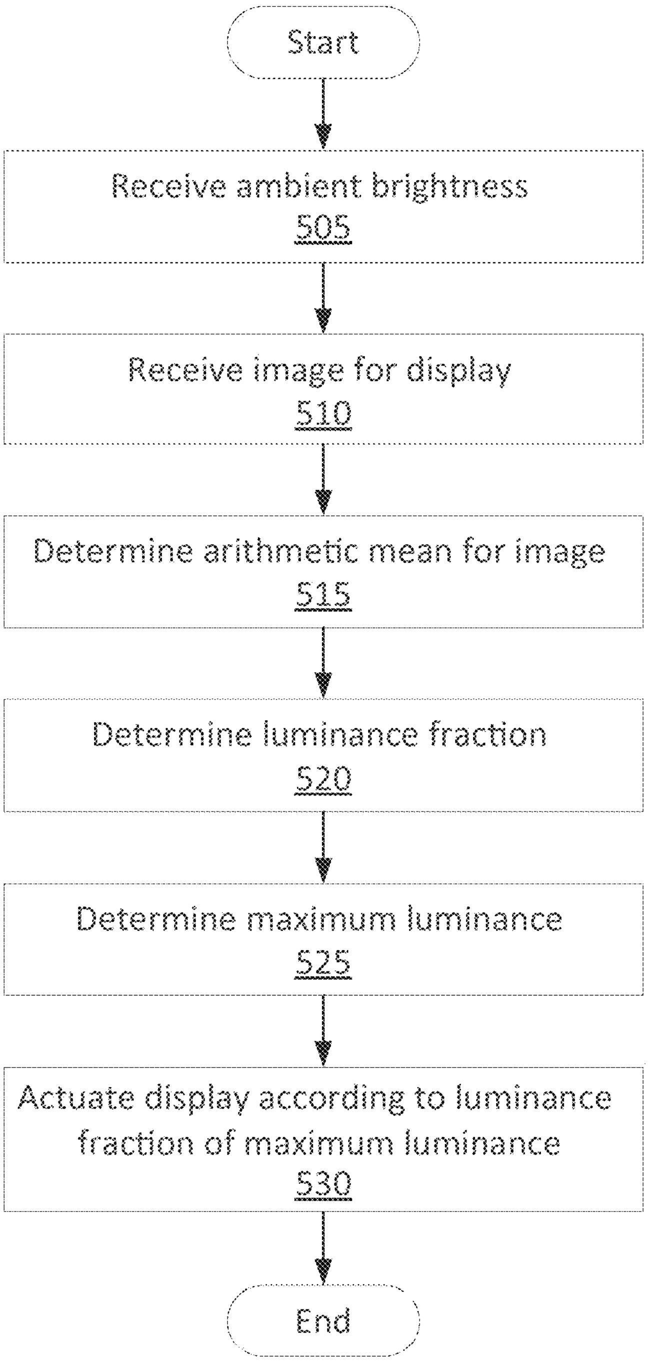
FIG. 5 is a flowchart of an example process for controlling the edge-lit display screen.

FIG. 5 is a flowchart illustrating an example process 500 for controlling the edge-lit display screen 105. The memory of the computer 405 stores executable instructions for performing the steps of the process 500 and/or programming can be implemented in structures such as mentioned above. As a general overview of the process 500, the computer 405 receives the ambient brightness, receives the image frame, determines the arithmetic mean for the image frame, determines the luminance fraction, determines the maximum luminance, and actuates the edge-lit display screen 105 according to the luminance fraction of the maximum luminance. The computer 405 may repeat the process 500 for as long as the edge-lit display screen 105 is active (e.g., as long as the vehicle 100 remains on).

The process 500 begins in a block 505, in which the computer 405 receives the ambient brightness from the ambient-light sensor 415, as described above.

Next, in a block 510, the computer 405 receives the image frame, as described above.

Next, in a block 515, the computer 405 determines the arithmetic mean of the RGB values in the image frame from the block 510, for example, by determining the red, green, and blue arithmetic means and selecting the greatest, as described above.

Next, in a block 520, the computer 405 determines the luminance fraction as a function of the arithmetic mean from the block 515, as described above.

Next, in a block 525, the computer 405 determines the maximum luminance as a function of the ambient brightness from the block 505, as described above.

Next, in a block 530, the computer 405 actuates the edge-lit display screen 105 to display an image frame at the luminance fraction (from the block 520) of the maximum luminance (from the block 525), as described above. The image frame may be from the block 505 in a current execution of the process 500, or the image frame may be from the block 505 in a preceding execution of the process 500, if the preceding image. After the block 530, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions (e.g., from a memory, a computer readable medium, etc.) and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. Use of "in response to," "upon determining," "upon receiving," etc. indicates a causal relationship, not merely a temporal relationship. The adjectives "first," "second," "third," and "fourth" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

determine an arithmetic mean of red-green-blue (RGB) values in an image frame;

determine a luminance fraction as a function of the arithmetic mean, the luminance fraction being a fraction of a maximum luminance of an edge-lit display screen, by:

setting the luminance fraction to a first preset value in response to the arithmetic mean exceeding a first threshold;

setting the luminance fraction to a second preset value in response to the arithmetic mean being below the first threshold and exceeding a second threshold;

setting the luminance fraction to a third preset value in response to the arithmetic mean being below the second threshold; and actuate the edge-lit display screen to display the image frame at the luminance fraction of the maximum luminance.

2. The computer of claim 1, wherein the RGB values include red values, green values, and blue values, and the instructions further include instructions to:

determine a red arithmetic mean of the red values, a green arithmetic mean of the green values, and a blue arithmetic mean of the blue values; and determine the arithmetic mean of the RGB values by selecting a maximum of the red arithmetic mean, the green arithmetic mean, and the blue arithmetic mean.

3. The computer of claim 1, wherein the arithmetic mean is determined from the RGB values over an entire area of the image frame.

4. The computer of claim 1, wherein the instructions to determine the luminance fraction include instructions to determine the luminance fraction according to an inverse relationship between the luminance fraction and the arithmetic mean.

5. The computer of claim 1, wherein the second preset value is greater than the first preset value.

6. The computer of claim 1, wherein the instructions to determine the luminance fraction include instructions to determine the luminance fraction as a function of only the arithmetic mean.

7. The computer of claim 1, wherein the instructions further include instructions to determine the maximum luminance as a function of an ambient brightness.

8. The computer of claim 7, wherein the instructions to determine the maximum luminance include instructions to determine the maximum luminance according to a positive relationship between the maximum luminance and the ambient brightness.

9. The computer of claim 1, wherein the image frame is a first image frame, and the instructions further include instructions to, before actuating the edge-lit display screen to display the first image frame, actuate the edge-lit display screen to display a second image frame at the luminance fraction of the maximum luminance.

10. The computer of claim 9, wherein the luminance fraction is a first luminance fraction, the arithmetic mean is a first arithmetic mean, and the instructions further include instructions to, before actuating the edge-lit display screen to display the second image frame at the first luminance fraction of the maximum luminance, actuate the edge-lit display screen to display the second image frame at a second luminance fraction of the maximum luminance based on a second arithmetic mean of RGB values in the second image frame.

11. The computer of claim 1, wherein the instructions to actuate the edge-lit display screen to display the image frame include instructions to actuate the edge-lit display screen to display the image frame at the luminance fraction of the maximum luminance over an entire area of the edge-lit display screen.

12. The computer of claim 1, wherein the edge-lit display screen is located inside a passenger compartment of a vehicle.

13. A method comprising:

determining an arithmetic mean of red-green-blue (RGB) values in an image frame;

determining a luminance fraction as a function of the arithmetic mean, the luminance fraction being a fraction of a maximum luminance of an edge-lit display screen, by:

setting the luminance fraction to a first preset value in response to the arithmetic mean exceeding a first threshold;

setting the luminance fraction to a second preset value in response to the arithmetic mean being below the first threshold and exceeding a second threshold;

setting the luminance fraction to a third preset value in response to the arithmetic mean being below the second threshold; and actuating the edge-lit display screen to display the image frame at the luminance fraction.

14. The method of claim 13, wherein the RGB values include red values, green values, and blue values, the method further comprising:

determining a red arithmetic mean of the red values, a green arithmetic mean of the green values, and a blue arithmetic mean of the blue values; and determining the arithmetic mean of the RGB values by selecting a maximum of the red arithmetic mean, the green arithmetic mean, and the blue arithmetic mean.

15. The method of claim 13, wherein determining the luminance fraction includes determining the luminance fraction according to an inverse relationship between the luminance fraction and the arithmetic mean.

16. The method of claim 13, wherein determining the luminance fraction includes determining the luminance fraction as a function of only the arithmetic mean.

17. The method of claim 13, further comprising, before actuating the edge-lit display screen to display the image frame, actuating the edge-lit display screen to display a preceding image frame at the luminance fraction of the maximum luminance.

18. The method of claim 13, wherein the edge-lit display screen is located inside a passenger compartment of a vehicle.

19. A computer comprising a processor and a memory, the memory storing instructions executable by the processor to:

determine a first arithmetic mean of red-green-blue (RGB) values in a first image frame;

determine a first luminance fraction as a function of the first arithmetic mean, the first luminance fraction being a fraction of a maximum luminance of an edge-lit display screen;

before actuating the edge-lit display screen to display a second image frame at the first luminance fraction of the maximum luminance, actuate the edge-lit display screen to display the second image frame at a second luminance fraction of the maximum luminance based on a second arithmetic mean of RGB values in the second image frame;

before actuating the edge-lit display screen to display the first image frame, actuate the edge-lit display screen to display the second image frame at the first luminance fraction of the maximum luminance; and actuate the edge-lit display screen to display the first image frame at the first luminance fraction of the maximum luminance.

* * * * *